No. 765,789. Patented July 26, 1904.

UNITED STATES PATENT OFFICE.

SAMUEL V. PEPPEL, OF COLUMBUS, OHIO.

PROCESS OF CONVERTING FURNACE-FLUE DUST INTO BLOCKS.

SPECIFICATION forming part of Letters Patent No. 765,789, dated July 26, 1904.

Application filed September 2, 1902. Serial No. 121,840. (No specimens.)

*To all whom it may concern:*

Be it known that I, SAMUEL V. PEPPEL, a citizen of the United States, residing at Columbus, in the county of Franklin and State of Ohio, have invented a certain new and useful Improvement in Processes of Converting Furnace-Flue Dust into Blocks, of which the following is a specification.

My invention relates to an improved process of converting furnace-flue dust or finely-divided ores into conglomerate bodies or blocks; and the object of my invention is to provide an improved process whereby the flue-dust from blast or smelting furnaces or powdered or finely-divided ores may be converted into blocks or bodies which are adapted for use in furnaces after the manner of ordinary ore.

Briefly stated, my improved process consists, first, in intimately mixing lime with the flue-dust from blast or other furnaces or with finely-divided ores; second, adding a sufficient quantity of water to facilitate the uniting of the particles of the mixture when under pressure; third, to press the mixture into blocks, bricks, or other bodies, and, fourth, to harden said blocks or bricks.

It will be understood that the lime employed in the above briefly-stated process may be in the nature of calcium oxid or magnesium oxid or any mixture or combination of both or chemical equivalent thereof and that said lime may be either slaked or unslaked. It will also be understood that the amount of water employed in the mixture is comparatively small, the same not being used in sufficient quantity to produce a plastic mass, but only sufficient to form a bond to hold the ore particles together when the same are subjected to heavy pressure, such as is exerted by a dry-press-brick machine. The proportionate amount of lime employed may vary from two to fifteen per cent., inasmuch as it is desirable to employ sufficient lime to flux all the impurities in the dust or ore to a slag of the same general composition as that on which the furnace is being run at the time the ore blocks are used. If sufficient silica is not present in the mixture to form with the lime a strong bond for the blocks to be made later, fine sand or clay may be added to compensate for the deficiency.

The preferable method of hardening the blocks consists in placing the same in an iron or steel cylinder and exposing them to live steam. This causes the lime to combine with the silica present, forming a hydrated calcium silicate. The length of time required for hardening by this method depends upon the temperature reached, which is a factor of the steam-pressure. It has been determined that one hundred and fifty pounds steam-pressure will harden the blocks in from six to eight hours. However, if it is desired to hasten the hardening, a small amount of ammonium chlorid is added to the original mixture. A second method of effecting the hardening of the blocks may consist in exposing said blocks to air rich in carbon dioxid and under pressure—the more carbon dioxid present and the higher the pressure the more rapid the hardening. The use of these blocks after the manner of ordinary ore in a furnace will tend to prevent bridging and hanging in the furnace, since said blocks are hard enough to carry the burden of the furnace until they get down to the fluxing zone in the furnace and will, on account of their size and block shape, keep the furnace-draft open and free. It is well known that when flue-dust in its dust form is fed back into the furnace the greater bulk thereof is carried back into the dust-chambers by the force of the draft on account of the fineness and light weight of said dust and that the remainder of the dust which is left in the furnace tends to clog the draft in places, thus causing irregular heating and irregular reduction, due to lack of uniformity in the distribution of the gases passing up through the furnace-stack.

There are two very important steps in the present process—viz., the mixing of the lime with the flue-dust or fine ore in a dry condition and the moistening of the dry mixture to a point short of a plastic mass. It is important that the two main elements be mixed first in a dry state, as said elements can be more easily and effectively mixed when dry than when wet or moist and the lime thereby more uniformly distributed throughout the mass. When damp or moist, the lime divides itself into nuclei, and the fine ore or dust balls up upon these nuclei, and it requires a vast amount of mixing and working to obtain anything like an even incorporation or distribution of the lime throughout the mass. Hence I have discovered that it is best to first mix the lime and ore or flue-dust in a dry state and then dampen or moisten the same, the dampening or moistening being sufficient only to facilitate the handling of the mass in forming the same into blocks and in drying the same.

The second step of dampening or moistening the mass to a point short of a plastic condition is not only important in rendering the same conveniently handleable, but renders the mass more readily dryable. That is to say, in subjecting the mass to artificial heat it requires much less heat and time to drive out the comparatively small amount of moisture than if the mass had been rendered plastic and a proportionately less floor-space should the mass be sun-dried. Moreover, there being but a small amount of moisture driven out, the product has very little porosity and great vitreosity, a condition highly essential to a fuel. Still further, as I employ but a very small quantity of water to moisten the mass, the labor and expense in handling the water is correspondingly small.

From the foregoing statement of the objects of first mixing the elements in a dry condition and then moistening them sufficiently only for handling it is apparent that in addition to reducing the time, labor, and expense expended a materially-improved product is the result, as the elements are mixed into a more homogeneous mass and the blocks are rendered exceedingly vitreous.

Having now fully described my invention, what I claim, and desire to secure by Letters Patent, is—

1. The herein-described process of converting flue-dust of a furnace or finely-divided ore into blocks, consisting of mixing a quantity of flue-dust or fine ore with water and lime substantially in the proportions stated, adding to such mixture a desirable quantity of ammonium chlorid, pressing the mixture into blocks and subjecting said blocks to a hardening process.

2. The herein-described process, consisting in mixing lime with flue-dust or fine ore, then moistening the mixture to a point short of a plastic mass, adding to the mixture ammonium chlorid, pressing the mixture into blocks, and then placing the blocks in a chamber and subjecting the same to the pressure and action of live steam.

3. The herein-described process consisting in mixing in a dry state hydrated lime with flue-dust or fine ore, then subjecting the mixture to the action of steam under pressure to moisten the same to a point short of a plastic mass to facilitate handling thereof, then forming the mixture into blocks, and finally placing the blocks in a chamber and subjecting the same to the pressure and action of live steam to harden and dry the same.

4. The herein-described process consisting in mixing in a dry state hydrated lime with flue-dust or fine ore, then subjecting the mixture to the action of steam under pressure to moisten the same short of a plastic mass to facilitate handling thereof, then forming the mixture into blocks, and finally subjecting the blocks to a hardening process.

SAMUEL V. PEPPEL.

In presence of—
C. C. SHEPHERD,
P. S. KARSHNER.